(12) United States Patent
Peron et al.

(10) Patent No.: US 7,868,555 B2
(45) Date of Patent: Jan. 11, 2011

(54) ENHANCED VEHICLE SIDE SIGNAL LIGHTING SYSTEM

(76) Inventors: Timothy Patrick Peron, 27 Westbrook La., Pomona, CA (US) 91766; Michael Christopher Peron, 11780 Westview Pkwy., #76, San Diego, CA (US) 92126; Ralph Eugene Sposato, 40 Westbrook La., Pomona, CA (US) 91766

( * ) Notice: Subject to any disclaimer, the term of this patent is extended or adjusted under 35 U.S.C. 154(b) by 468 days.

(21) Appl. No.: 12/107,841

(22) Filed: Apr. 23, 2008

(65) Prior Publication Data

US 2008/0259621 A1    Oct. 23, 2008

(51) Int. Cl.
H05B 37/00    (2006.01)
(52) U.S. Cl. .................... 315/77; 315/307; 307/10.8
(58) Field of Classification Search .......... 315/291, 315/307, 82, 83, 77; 307/10.1, 10.8
See application file for complete search history.

(56) References Cited

U.S. PATENT DOCUMENTS

| | | | |
|---|---|---|---|
| 4,622,494 A | 11/1986 | Johnson | |
| 4,947,293 A | 8/1990 | Johnson et al. | |
| 5,152,599 A | 10/1992 | Lewis et al. | |
| 5,209,559 A | 5/1993 | Ruppel | |
| 5,428,512 A | 6/1995 | Mouzas | |
| 5,430,625 A | 7/1995 | Abarr et al. | |
| 5,461,288 A * | 10/1995 | Chaves et al. | ............ 315/241 P |
| 5,510,763 A | 4/1996 | Deckard et al. | |
| 5,682,138 A | 10/1997 | Powell et al. | |
| 6,018,295 A | 1/2000 | Jewell et al. | |
| 6,461,028 B1 | 10/2002 | Huang | |
| 6,867,557 B2 * | 3/2005 | Ito et al. | ............ 315/307 |
| 7,002,458 B2 | 2/2006 | Su | |
| 7,095,334 B2 | 8/2006 | Pederson | |

* cited by examiner

*Primary Examiner*—David Hung Vu
(74) *Attorney, Agent, or Firm*—Fay Sharpe LLP

(57) ABSTRACT

The present invention relates to a vehicle side light system for signaling an event that is directly connected to a vehicle's signaling system and power source. The system comprises at least one series of lights having multiple light emitting devices set in a row, a flexible circuit attached to at least one circuit of a vehicle and at least one digital shift register coupled to at least one schmitt trigger circuit. The lights in the system are automatically sequentially activated by the schmitt trigger circuits to signal the occurrence of an event. The light system may alternatively be attached to an independent power source to add instinctive awareness to an object or situation.

16 Claims, 3 Drawing Sheets

ENHANCED VEHICLE SIDE SIGNAL LIGHTING SYSTEM

The present invention relates to a lighting system. It finds particular application in conjunction with a vehicle side light system to improve visibility of larger vehicles through a unique set of lights mounted on each side of the vehicle, and will be described with particular reference thereto. The invention can be applied to both "after-market" applications on existing vehicles as well as "in-line" production on new vehicles. However, it is to be appreciated that the present exemplary embodiment is also amenable to other like applications including vehicle top illumination for law enforcement and traffic management applications as well as applying to non-vehicular structures.

BACKGROUND

Accident statistics indicate that motor vehicle related accidents result in millions of injuries each year, and over 45,000 fatalities. Over 500,000 of these accidents involve trucks and other large vehicles. Of these total large vehicle accidents, a high number end in fatalities, with statistics putting the number of deaths from such accidents at about 5,000 each year. Many of these accidents are caused by a lack of driver awareness to the intentions of large vehicle's lane changes and turns. This problem is exacerbated because the current large vehicle side active lighting/passive reflector systems are not clearly visible to surrounding observers, especially those on the both sides of the large vehicles.

Vehicle lighting systems are well known in the art, such as U.S. Pat. No. 6,018,295, which teaches a vehicle safety light system that provides lights along the side panels of the vehicle, while the vehicle's engine is operating, to increase visibility of the vehicle to other drivers. However, such light system only operates when the vehicle's engine is running and cannot be used when the vehicle is turned off but still in a hazardous situation. Further, this referenced system is similar to a vehicle's blinker in that all of the lights are illuminated simultaneously, so it is easy to miss if you do not catch it at the proper time. U.S. Pat. No. 7,095,334 discloses a warning signal light assembly used to provide various colored light signals for use by an emergency vehicle. However, the light assembly disclosed is not connected to the vehicle's turn signals or hazard lights; therefore would not alert nearby vehicles and observers to the vehicle's intent. U.S. Pat. No. 5,682,138 teaches of an illumination system mounted on or adjacent to the side of a trailer for the illumination of the rear wheel assembly of a wheeled vehicle in response to actuation of a turn signal. The illumination system works to assist a trailer vehicle operator in identifying potential objects or obstacles or concern such as curbs, parked vehicles, etc. This system however, does not alert other vehicles or observers of any intent to turn or change lanes since the light is specifically aimed towards the wheel and not directed outwardly.

Therefore, a vehicle light system has yet to be developed that facilitates improved safety measures for large vehicles, specifically to alert other vehicles or observers of the large vehicle's intent to turn, change lanes, or announce hazards. Such a system would greatly improve safety on the roadways and lower the number of large vehicle related accidents, and inevitably save lives.

BRIEF DESCRIPTION

The present invention relates to a vehicle side light system for signaling an event that is directly connected to a vehicle's signal system and power source. The system comprises at least one series of lights having multiple light emitting devices set in a row, a flexible circuit (e.g. printed flex circuit or ribbon wire variety) attached to at least one surface of a vehicle and at least one digital shift register coupled to at least one schmitt trigger circuit. The lights in the system are automatically sequentially activated by the schmitt trigger circuits to signal the occurrence of an event.

Another embodiment of the present invention relates to a light system comprising at least one flexible series of lights having multiple light emitting devices set in a row mounted on a flexible circuit and connected to a common ground. The light system of such an embodiment further comprises a power source, at least one schmitt trigger oscillator, at least one digital shift register, at least one single start pulse circuit; and at least one power on reset circuit. Upon activation of an event, the schmitt trigger oscillator is signaled to "clock" pulses through the digital shift register that individually activates each light emitting device.

BRIEF DESCRIPTION OF THE DRAWINGS

The invention will now be described by way of example only, with reference to the accompanying drawings, in which.

DETAILED DESCRIPTION

Figure 1:
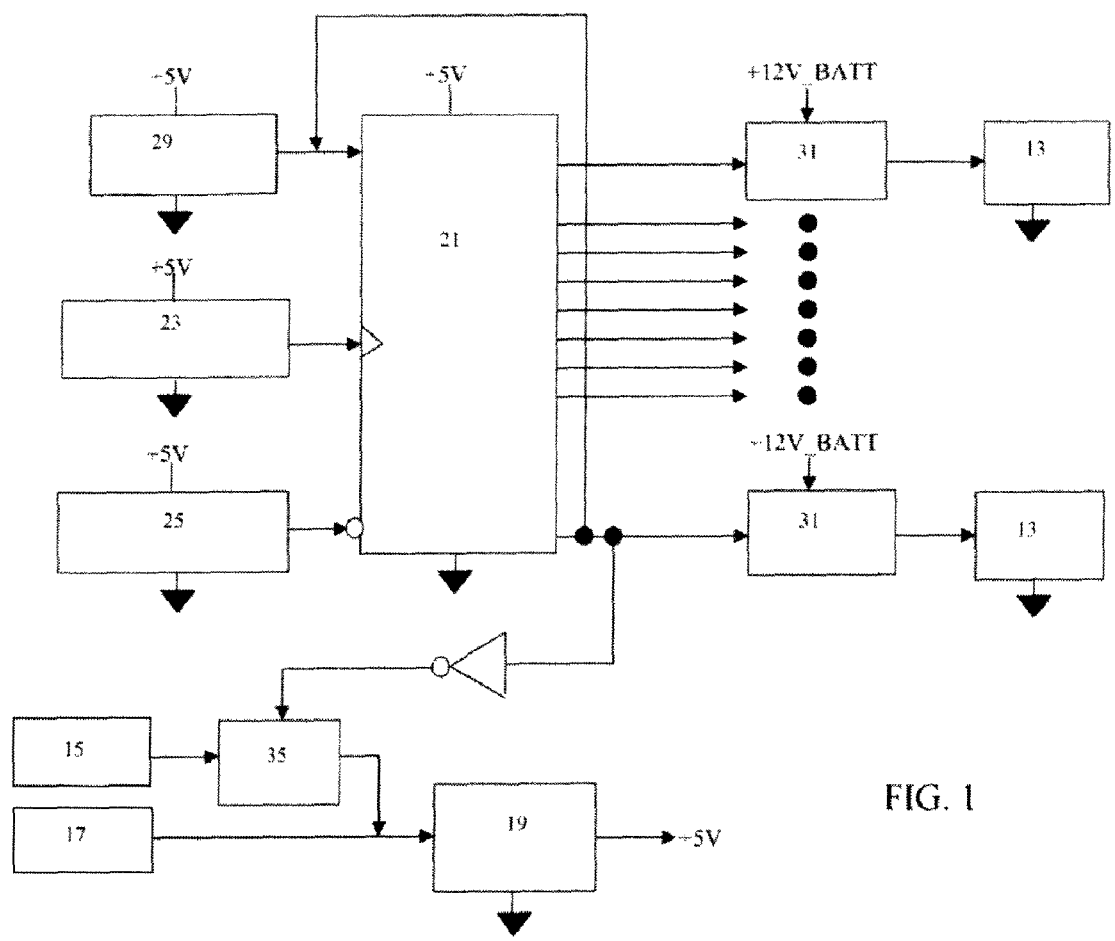
FIG. 1 is block diagram representing the LED light sequencer.

This application incorporates by reference the description set forth in Provisional Application No. 60/913,488, filed Apr. 23, 2007. Referring now to the drawings wherein the showings are for purpose of illustrating the exemplary embodiments only and not for purposes of limiting the claimed subject matter, FIG. 1 provides a block diagram representing one embodiment of the functionality of the light system 11 of the present invention. The light system 11 includes at least one series of lights, each including one or more light emitting devices 13 mounted on a flexible circuit (not shown) and connected to a single common ground. Preferably, the light emitting devices are high intensity light emitting diodes (LED); however, any light emitting devices known in the art may be used. The flexible circuit can be attached to virtually any surface, including the side of a vehicle. The flexible circuit and its associated elements are protected from harsh environmental conditions typical of outdoor applications (e.g. weather, shock, vibration) by use of standard packaging techniques such as potting, conformal coating and shock mounts. Preferably, the circuit is attached using high-strength, adhesive tape on the side opposite the light emitting devices 13. Alternatively, the circuit may be attached using a high strength magnet, Velcro, adhesive or other means known in the art, depending on the intended application.

In one embodiment of the present invention, the circuit is attached to a vehicle and connected to a vehicle's 12 volt DC power source 15 (e.g. battery/alternator) and the vehicle's switched 12 volt DC signal wires 17, including turn signal and hazard lines. Upon activation of any of the aforementioned vehicle's signal, the vehicle's power source 15 and signal wires 17 supply power to a master power load switch 35 that powers a 5 volt regulator 19 providing regulated power to the lighting system. The master power load switch 35 then enables regulated power 19 to a schmitt trigger oscillator clock 23, at least one digital shift register 21, a schmitt trigger single start pulse circuit 29 and a schmitt trigger power on reset (POR) circuit 25. Other electrical components used in the system include capacitors, resistors and potentiometers (not shown). Functionality of the potentiometers includes but is not limited to; manually pre-setting the individual light flash time, the chase sequence rate and lighting intensity.

When a turn signal or hazard flasher is activated, the voltage regulator 19 is turned on and the POR circuit 25 resets the digital shift register 21. The system resistors and capacitors form an adjustable single logic high to logic low pulse of approximately 47 mS to 147 mS long to the schmitt trigger single pulse circuit 29. The schmitt trigger oscillator clock 23 is then signaled to "clock" the single start "pulse" 29 into the first output of the digital shift register 21. On each rising clock edge, the pulse is sequentially advanced through the digital shift register 21 and individually activates each light load switch 31 to supply sequential power to each light 13 at an adjustable rate (via potentiometer or other digital means) that optimizes recognition by the observers. The timing is such that the first clock pulse out of the first output of the digital shift register 21 will coincide with the single logic high level pulse. The digital shift register 21 clocks this high level input to the first output. Each subsequent clock will shift the single output pulse to the next shift register output. The last output of the digital shift register 21 is connected back to the input of the digital shift register 21, shared with the schmitt trigger single pulse circuit 29 to repeat the sequence again. The schmitt trigger oscillator clock circuit will continue to supply pulses to the digital shift register 21 as long as +5V is available from the voltage regulator 19. Therefore, the process finishes shortly after the signal 17 is deactivated. Upon deactivation, the chase sequence is allowed to continue until the last light in the chain is illuminated. In another embodiment of the present invention, the chase sequence is terminated simultaneously with the deactivation of the turn signal or hazards.

The main current through each light load switch 31 has a current draw of about 100-300 milliamps depending on the desired light intensity. Preferably, the schmitt triggers and digital shift register together draw less than a milliamp. The POR circuit, schmitt trigger oscillator clock circuit, and schmitt trigger single pulse circuit are stand-alone circuits and not influenced by each other. Each circuit however, uses a schmitt trigger to form reliable clean digital edges.

The light sequence is preferably a "chase sequence," wherein each light essentially chases the next, creating the appearance that the light is traveling down the row from front to back. The sequential rate is preferably adjustable to the preference and needs of the user. The side displaying the "chase sequence" correlates with the side on which the vehicle's turn signal was activated; therefore provides other drivers or observers visible notice of a vehicle's intention to either move lanes, turn, or initiate the hazard lights. In the case of hazard lights, the "chase sequence" appears simultaneously on each side of the vehicle.

In another embodiment of the present invention, the light system 11 is attached to an independent power source. Since the string of lights is very flexible, it easily follows the contour of any object. Such possible attachment objects include, but are not limited to bridges, cranes, electrical towers and other structures where a bright trailing row of lights would add instinctive awareness to the location of the object that may pose a potentially hazardous situation to those nearby. In this embodiment, the lights are activated by an event requiring heightened safety and awareness. The master power load switch 35 may be activated either manually, by some pre-set trigger, or by any other method know in the art.

The number of wires contained in the flexible circuit is proportional to the number of lights needed designated by the length of the item to be lighted by the device. Preferably, said lights are less than 2 feet apart; however more preferably, the said lights are about 1 foot apart. For example, a 50 ft. run would comprise 50 LED lights, 50 wires, and one ground wire. The preferable wire would be 14-22 gauge in size, depending on the application.

Figure 2:
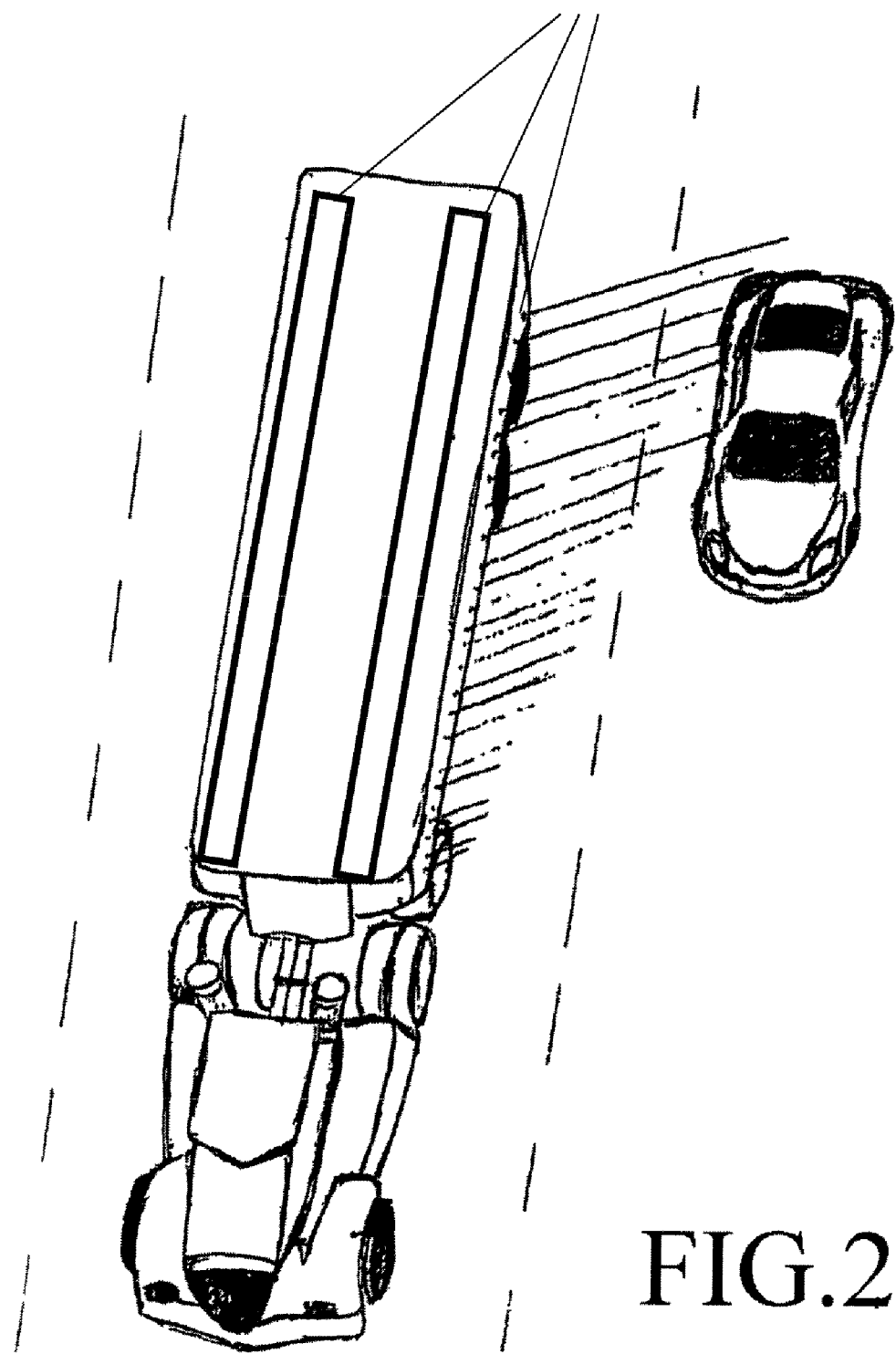
FIG. 2 is a top view of one embodiment of the light system alerting a nearby vehicle of its intention to change lanes.
Figure 3:
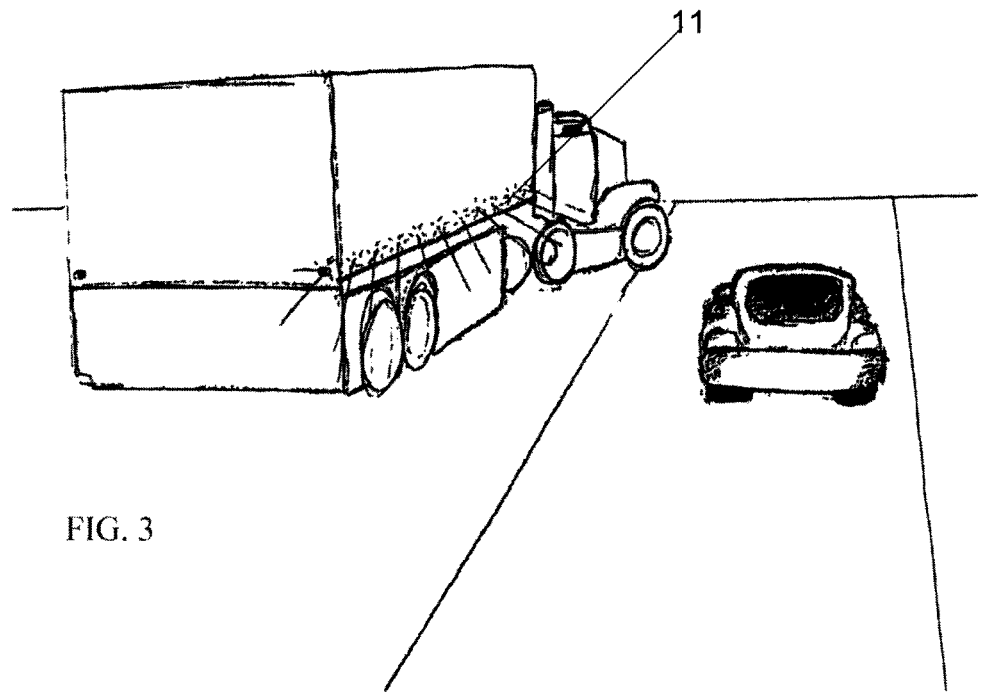
FIG. 3 is a rear view of one embodiment of the light system alerting a nearby vehicle of its intention to change lanes.
Figure 4:
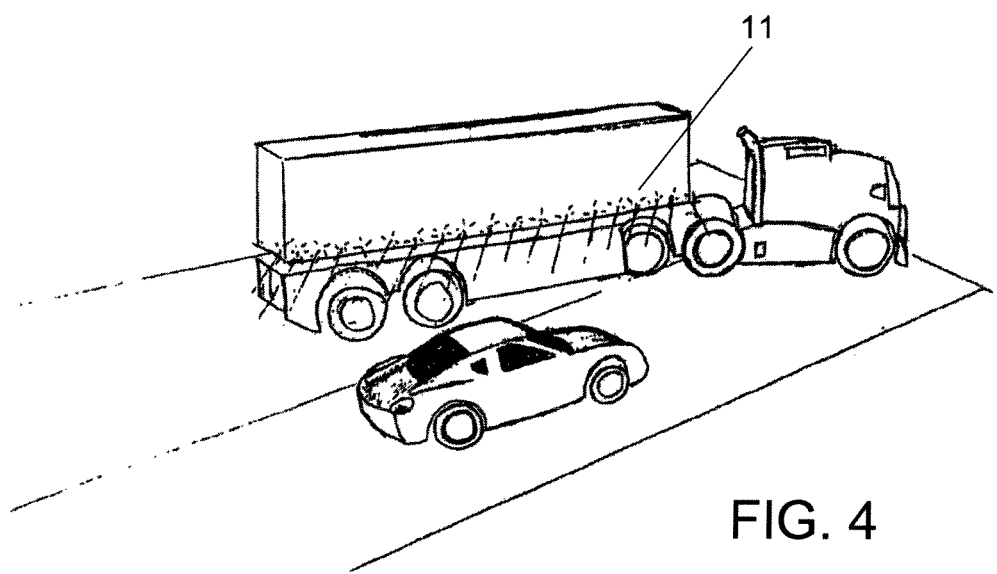
FIG. 4 is a side view of one embodiment of the light system alerting a nearby vehicle of its intention to change lanes.

FIGS. 2, 3 and 4 represent various views of a preferred embodiment of the present invention, wherein the light system 11 is used on the side of the tractor-trailer of a semi-truck. Similar light strips 11 can also be applied to the roof on each side of the vehicle so they can be recognized by airborne law enforcement and traffic reporting vehicles. Referring specifically to FIG. 2, the light "chase sequence" displayed on the side of the trailer informs the driver of the nearby vehicle of the truck's intention to change lanes. In this case, even if the nearby vehicle was in the truck's blind spot, the vehicle would be alerted that the truck wants to move and can change speed or move lanes accordingly to avoid the truck. Similarly in FIGS. 3 and 4, the nearby vehicle is beside the truck; therefore, the truck's rear blinker lights would not be visible to the driver of the vehicle and the driver would not be aware of the truck's intent to change lanes. The side lighting system of the present invention works as a supplement to vehicle blinkers to ensure vehicle awareness and increases safety.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle light device adapted for connection to a vehicle's signal system and the vehicle's power source, said device comprising:
    at least one flexible series of lights having multiple light emitting devices;
    a flexible circuit attached to at least one surface of said vehicle; and
    associated elements consisting of at least one digital shift register coupled to at least one schmitt trigger, wherein said lights can be sequentially activated by said schmitt trigger oscillator.

2. The light device of claim 1, wherein said lights can be high or low intensity light emitting diodes depending on the specific application.

3. The light device of claim 1, wherein said system is connected to a vehicle's 12 volt DC power source and the vehicle's 12 volt DC signal wires.

4. The light device of claim 3, wherein said signal wires are connected to said digital shift register using a voltage conversion circuit.

5. The light device of claim 1, wherein said schmitt trigger clocks said digital shift register to supply sequential power to each light through a load switch.

6. The light device of claim 1, wherein said associated elements are embedded at one end of said flexible circuit.

7. The light device of claim 1, wherein said flexible circuit is attached to said surface using a variety of means in the art including adhesive tape, Velcro, adhesive or strong magnet.

8. The light device of claim 1, wherein said flexible circuit is thin, pliable, light weight, durable and bendable.

9. The light device of claim 1 wherein said device is utilized to signal at least one of a turn, a lane change, or the encounter of a hazardous condition.

10. The light device of claim 1, wherein said light system can withstand extreme weather conditions.

11. A light system comprising at least one series of lights having multiple light emitting devices set in a row and mounted on a flexible circuit and connected to a common ground, said light system further comprising;

a power source; at least one schmitt trigger oscillator; at least one digital shift register; a clock circuit; a single start pulse circuit; and a power on reset circuit, wherein upon activation of said light system, said schmitt trigger oscillator is signaled to "clock" pulses through said digital shift register and sequentially activate each light emitting device through a load switch.

12. The light system of claim 11, wherein said schmitt trigger outputs said pulses formed from resistors and a capacitor input network.

13. The light system of claim 12, wherein said resistors and capacitor input network form an adjustable single logic high to logic low pulse.

14. The light system of claim 11, wherein the number of wires contained in said flexible circuit proportional to the number of lights needed in the run designated by the length of the item to be lighted by the device.

15. The light system of claim 11, wherein said activation of said light emitting devices results in a "chase sequence."

16. The light system of claim 11, wherein said light emitting devices are high intensity light emitting diodes.

* * * * *